Sept. 15, 1959  J. B. BIDWELL  2,904,120
POWER STEERING
Filed June 13, 1957

INVENTOR.
Joseph B. Bidwell
BY
J. C. Thorpe
ATTORNEY

United States Patent Office 2,904,120
Patented Sept. 15, 1959

2,904,120
POWER STEERING

Joseph B. Bidwell, Royal Oak, Mich., assignor to General Motors Corporation, Detroit, Mich., a corporation of Delaware Application June 13, 1957, Serial No. 665,516

6 Claims. (Cl. 180—79.2)

This invention concerns automotive vehicles and more especially relates to improvements in the steering and handling characteristics of such vehicles, particularly when equipped with power steering apparatus.

It is generally recognized among automotive engineers that the operator of an automotive vehicle steers, in part, by "feel" derived through his hands at the steering wheel and, in part, through visual observation of differences between course heading and desired heading of the vehicle.

Driving skill is perhaps best measured in terms of the speed with which the individual reacts and responds to changing conditions affecting vehicle heading. Using this test, it is manifest on the basis of empirical observation alone, that the variation in driving skill among drivers as a whole, or for that matter among drivers in any selected group, excepting possibly experienced test and racing drivers, is very substantial indeed. Clearly, if some means could be found which would operate, in effect, to quicken the receptivity and responsiveness of the driver, whatever his inherent skill, the result would be highly beneficial.

The present invention aims to provide such means by feeding to the driver at the steering wheel force reactions not hitherto sensed in motor vehicle operation.

A further object is to provide steering control means which tend to keep the vehicle on a straight course, i.e. to reduce lateral acceleration of the vehicle to zero.

Another and more specific object of the invention is to provide a system of apparatus for application to a power steered vehicle, which apparatus in operation modulates the action of the power steering control means to achieve the results sought.

There are two conditions of motor vehicle operation which particularly illustrate the need for this invention. The first is the incipient skid condition where the rear wheels of the vehicle are tending to break away, and the second is that obtaining when the vehicle encounters a strong, sudden, transverse wind gust. In the former case, the road forces normally sensed at the steering wheel as "feel" tend to disappear leaving the driver with no front wheel position information, and in the latter case the road load on the front wheels develops too late for the driver to make the necessary steering correction. The present invention answers fully to both of these conditions. Thus, in either case it immediately indicates to the driver through the steering wheel the direction the dirigible wheels are turned, permitting the speediest possible recovery.

The free-control (hands-off) stability of the vehicle is markedly improved by the present invention. Indeed, in certain emergency situations, as a skid on ice, it is not infrequently best that the steering wheel be released entirely so that the vehicle will be permitted to straighten up automatically.

The modulation of the power steering control means to attain the desired effects is accomplished according to the invention by a hydraulic restrictor of novel construction and operation.

A preferred embodiment of the invention as applied to a vehicle equipped with a hydraulic power steering system is illustrated by the accompanying drawings which will be referred to in the further description and in which.

Figure 1:
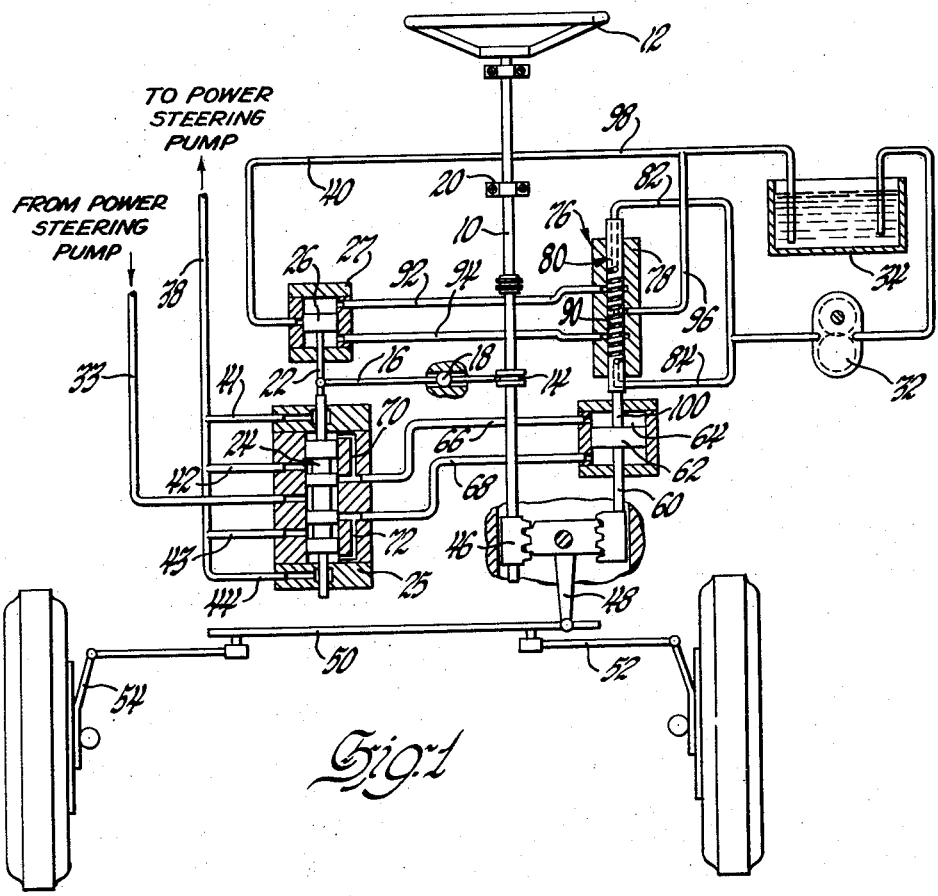
Fig. 1 shows in diagrammatic fashion a steering system incorporating auxiliary apparatus conforming with the invention.

Referring first to Figure 1, the numeral 10 denotes a steering shaft carrying the usual steering wheel 12 at its upper end. The shaft is enlarged and annularly grooved at 14 to accommodate the end of a lever 16 fulcrumed at 18. Thus, on axial movement of the shaft induced by steering reaction as later explained, lever 16 will rotate on its pivot in a direction determined by the direction of axial movement of the shaft.

A flexible coupling 20 of any suitable type serves to take care of alignment problems and may be so designed that the reactionary axial movement of the shaft 10 is limited to the portion thereof below the coupling.

Lever 16 will be seen as connected at its end leftward of its fulcrum to a stem or shaft element 22 common to a valve spool 24 axially displaceable within a housing 25 and a piston 26 confined within a cylinder 27.

Housing 25 is suitably ported to receive pressure fluid supplied by a power steering pump which may be of any suitable type—see, for example, Patent No. 2,858,766, granted Nov. 4, 1958. The power steering pump may be powered as from the crankshaft of the engine of the vehicle.

Either a constant displacement pump incorporating a suitable bypass mechanism appropriately controlled by discharge pressure or a variable displacement pump may be employed.

Fluid exhausted from a valve 24, 25 is returned to the reservoir from which the power steering pump draws via a conduit 38. Exhaust fluid enters the conduit 38 via conduits 41, 42, 43 and 44 of which conduits 41 and 44 represent simply extensions of bleed passages.

Before continuing with the description of the hydraulic components of the system, the mechanical parts thereof beyond the steering shaft 10 should perhaps be described. Thus, it is to be noted that the shaft 10 carries at the lower end thereof a ball nut 46 racked to the upper portion of a pitman arm 48. Such arm has connection with the drag link component 50 of a parallelogram steering linkage including tie rods 52 and radius rods 54.

The construction and operation of ball nuts such as part 46 will be made clear by reference to Hawkins Patent No. 2,267,425, for instance.

In addition to being operably connected to the ball nut, pitman arm 48 is similarly connected to the lower shaft 60 of a power piston 62 confined within a cylinder 64. The cylinder has communication with the valve 24, 25 via conduits 66, 68. Within the housing for the valve, conduit 66 communicates with a passage 70 while conduit 68 communicates with a similar passage 72. These passages 70 and 72 open to chambers at the ends of the spool 24 and in operation of the gear the fluid in the chambers acts to resist movement of the spool thereby to provide an artificial "feel" at the steering wheel. This resistance is additional to that imposed by the unit 27, 26 as later described.

Figure 2:
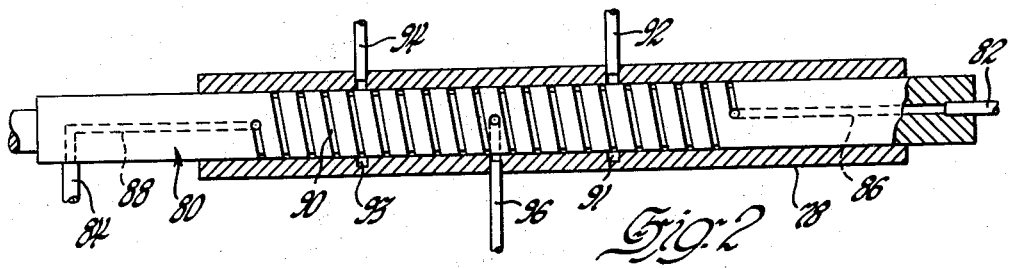
Fig. 2 is a longitudinal section through the restrictor device.

Disposed above the power cylinder 64 is a variable restrictor 76 including a housing 78 and a spool 80. The restrictor is supplied with pressure fluid from a pump 32 via conduits 82 and 84 which communicate (Fig. 2) with corresponding bores 86 and 88, respectively, in the spool 80.

The inner ends of these bores will be seen interconnected by a helical groove 90 formed in the spool. Inward of the inner end of the bore 86 a conduit 92, extending to the upper chamber of the previously mentioned cylinder 27, opens to an annular channel 91 in the housing 78. Similarly, inward of the bore 88 a conduit 94, extending to the lower chamber of the cylinder 27, opens to an annular channel or groove 93 in the restrictor housing. A conduit 96 mediate conduits 92 and 94 connects to a return line 98 extending to the pump or reservoir 34 from which the pump 32 draws. This pump operates at a speed proportional to vehicle speed, being driven, for example, when the vehicle is provided with a conventional automatic hydraulic transmission by the transmission governor. In such case, the output of the pump, if of constant displacement, is proportional to the square of the vehicle speed.

The helical groove 90 is of constant cross-section and, accordingly, the pressure gradient therealong is constant. The fluid supplied by the pump 32 is of substantial viscosity and at any point along the helical path between the inner end of each bore 86, 88 and the drain hole the pressure of the fluid is a function of the distance between the bore and the drain hole.

As shown, spool 80 is fixedly secured to a shaft 100, similarly secured to the power piston 62. Thus, spool 80 partakes of all movements of the piston, being displaced upwardly when the piston moves upwardly and being displaced downwardly when the piston moves downwardly. Assuming downward movement of the piston 62, for example, the fluid supplied to the upper chamber of the cylinder 27 will be under a pressure which will be higher the greater the displacement of the spool 80, while the fluid supplied to the lower chamber of the cylinder 27 will be under a pressure which will be less the greater the displacement of the spool. If on the other hand, piston 62 moves upwardly the pressure differential across the piston 26 will be in favor of the lower chamber of the cylinder 27.

The system as disclosed contemplates the application of reactionary axial thrust of the lower portion of the steering shaft 10 to bring about displacement of the spool 24 of the power steering control valve. In this connection, reference is made to Davis Patent No. 2,213,271. Suffice it to say here that on a right turn the lower portion of the shaft 10 reacts axially upwardly, while on a left turn the reaction is downward. With the arrangement as shown, it should be clear that downward reaction of the steering shaft, for example, corresponding to a left turn, results in upward shifting of the power steering control valve spool 24 with interconnection of the pressure line 33 and line 66 extending to the upper chamber of the power cylinder 64. It should further be clear that the displacement of the spool 24 necessarily involves the overcoming of the pressure in the upper chamber of cylinder 27. And such pressure as above brought out is a function of the degree of displacement of the hydraulic restrictor spool 80.

Considering the foregoing in relation to the fact that the pump 32 is driven at a speed proportional to vehicle speed and the further fact that the degree of axial displacement of the spool 80 depends on the degree of angularity of the dirigible wheels, it should be evident that in a turn the extent of the resistance to displacement of the control valve spool 24 imposed by the pressure differential obtaining in cylinder 27 depends on two factors, namely, the speed at which the vehicle is traveling and the radius of the turn. Thus, maximum resistance to displacement of spool 24 is imposed under conditions of a sharp turn and high speed, while minimum resistance to displacement of such spool is imposed under conditions of a long gradual curve negotiated at low speed.

On the foregoing, the similarity between the variable restrictor and a pendulum controlled valve which may be applied for the same purpose (see Schilling application Serial No. 578,067, filed April 13, 1956 assigned to the assignee of the instant case) should be apparent. This similarity can be demonstrated mathematically as follows:

The lateral or side acceleration A of a car C (Fig. 3) traveling at velocity V in a curved path of radius R is:

$$A = \frac{V^2}{R}$$

In the case of the disclosure of Schilling, it is a force proportional to this signal which is used to improve the free control and stability of the vehicle. It can be shown that if tire slip angles are neglected, the forces developed by the system herein are equivalent. Assuming then zero tire slip angle, the angular displacement of the steering wheel, $\theta$, from its neutral position is related to the radius of curvature of the car path in the manner:

$$\theta = \frac{K_2}{R}$$

Where $K_2$ is a constant. If the displacement of the restrictor spool 80 be made proportional to wheel angle $\theta$, then the resisting force applied to the power steering control valve spool 24 via piston 26 will be:

$$F = K_3 \frac{P_s}{R}$$

but $$P_s = K_4 V^2$$

Therefore $$F = K_5 \frac{V^2}{R}$$

which is seen to be proportional to lateral acceleration.

Figure 3:
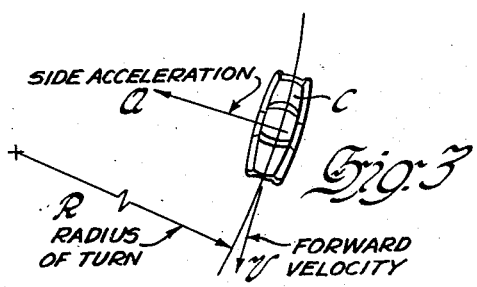
Fig. 3 illustrates forces acting upon a vehicle in the negotiation of a right turn of constant radius.

There remains for discussion the action of the variable restrictor as a safety contrivance and as a device for providing automatic righting of the vehicle following an inertia disturbance. In this connection, let us assume that the vehicle in Figure 3 is traveling at such an excessive speed that it has begun to spin. In other words, the center of turning has moved ahead of the dirigible wheels of the vehicle and, as is usually the case, closer to the right side thereof. Correction of a spin in the indicated direction, of course, requires prompt turning of the dirigible wheels to the left. Since the resisting pressure set up by the variable restrictor through the cylinder 27 is acting in a direction tending to steer the dirigible wheels to the left, and since the force tending to maintain the variable restrictor spool displaced is magnified under the spin condition due to the increased frictional contact of the tires with the road surface, the operator instinctively and substantially instantaneously follows the lead of the variable restrictor-induced pressure, quickly righting the vehicle. In other words, the resisting pressure set up by the variable restrictor acts in a direction tending to steer the dirigible wheels to the left, hence the operator being "force" informed, and substantially instantaneously, follows the lead of the variable restrictor-induced pressure, quickly stabilizing the vehicle.

In the case of a spin caused by ice, extensive over the roadway, the operator of a conventional vehicle may lose entirely his feel of the angular disposition of the dirigible wheels due to the decreased frictional contact of the tires with the road surface—a situation prone to result in a serious mishap. This cannot occur with a vehicle equipped according to the invention, since the disposition of the dirigible wheels is telegraphed to the operator artificially through the described hydraulic circuit. Actually, as has been hereinbefore suggested, the operator may remove his hands from the steering wheel altogether and allow the vehicle to right itself automatically.

It will be observed from the drawings that the helical path between the bore 86 of the variable restrictor spool 80 and the conduit 92 is slightly longer than the helical path between bore 88 and the conduit 94. The purpose of this is to compensate for the presence of the piston shaft in cylinder 27, which reduces the effective area of the lower face of the piston 26. If the bores were equally spaced from the corresponding conduits, for a given angular displacement of the dirigible wheels, the resistance to displacement of spool 24 would be greater on upward movement of such spool than on downward movement thereof. It is manifestly desirable that the force reaction be equal in both directions of turn.

What I claim is:

1. In a self-propelled vehicle having dirigible means and power steering apparatus comprising a power source, motor means operably connected to a steering member and control means for said motor means, a fluid pressure generator carried by the vehicle and driven through means whereby the output thereof is proportional to the speed of the vehicle, a variable restrictor in fluid circuit with said generator incorporating a movable component operably connected to said dirigible means so that it occupies positions corresponding to positions assumed by said dirigible means, and means for applying the output of said variable restrictor to modulate the action of said control means.

2. In a self-propelled vehicle having dirigible means and power steering apparatus comprising a power source, motor means operably connected to a steering member and control means for said motor means, a fluid pressure generator carried by the vehicle and driven through means whereby the output thereof is proportional to the speed of the vehicle, a variable restrictor comprising a housing member and a spool element within said housing member having a helical groove, said spool element being formed for the introduction of fluid supplied by said generator into said groove at each end thereof, said housing member having therein a pair of spaced outlet ports opening to said groove and an exhaust port opening to said groove at a point mediate said outlet ports, means operably connecting said dirigible means and said spool element so that the latter occupies positions corresponding to positions assumed by said dirigible means and means for applying the output of said variable restrictor to modulate the action of said control means.

3. In a self-propelled vehicle having a pair of dirigible wheels and equipped with power steering apparatus including an hydraulic motor and a control valve therefor, a fluid pressure generator carried by the vehicle and driven through means whereby the output thereof is proportional to the speed of the vehicle, a variable restrictor comprising a housing member and a spool element within said housing member having a helical groove, said spool element being formed for the introduction of fluid supplied by said generator into said groove at each end thereof, said housing member having therein a pair of spaced outlet ports opening to said groove and an exhaust port opening to said groove at a point mediate said outlet ports, means operably connecting said dirigible wheels and said spool element so that the latter occupies positions corresponding to positions assumed by said dirigible wheels, and means for applying fluid supplied through said outlet ports as a resistance to actuation of said control valve.

4. In a self-propelled vehicle having dirigible means and equipped with power steering apparatus including an hydraulic motor and a control valve for said motor comprising an axially movable spool member, a fluid-pressure generator carried by the vehicle and driven by means whereby the output thereof is proportional to the speed of the vehicle, said generator being the pressure source for the operation of said motor, a variable restrictor comprising a housing member and a spool element within said housing member having a helical groove, said spool element being formed for the introduction of fluid supplied by said generator into said groove at each end thereof, said housing member having therein a pair of spaced outlet ports opening to said groove and an exhaust port opening to said groove at a point mediate said outlet ports, means operably connecting said dirigible means and said spool element so that the latter occupies positions corresponding to positions assumed by said dirigible means and means for applying fluid supplied through said outlet ports as a resistance to actuation of said spool member.

5. In a self-propelled vehicle having dirigible means and equipped with power steering apparatus including an hydraulic motor comprising a piston operably connected to a steering member and a control valve for said motor comprising an axially movable spool member, a fluid pressure generator carried by the vehicle and driven by means whereby the output thereof is proportional to the speed of the vehicle, said generator being the pressure source for the operation of said motor, a variable restrictor comprising a housing member and a spool element within said housing member having a helical groove, said spool element being formed for the introduction of fluid supplied by said generator into said groove at each end thereof, said housing member having therein a pair of spaced outlet ports opening to said groove and exhaust port opening to said groove at a point mediate said outlet ports, means operably connecting said spool element and said piston whereby said spool element occupies positions corresponding to positions assumed by said dirigible means, and means for applying fluid supplied through said outlet ports as a resistance to actuation of said spool member.

6. The combination of claim 5 where said last means comprises a cylinder having a piston therewithin operably connected to said spool member, said cylinder having a pair of ports, one at either end of the piston, connected to said outlet ports and an exhaust port normally closed by the piston.

References Cited in the file of this patent

UNITED STATES PATENTS

| | | |
|---|---|---|
| 1,395,001 | McDonald | Oct. 25, 1921 |
| 2,081,054 | Kenyon | May 18, 1937 |
| 2,191,125 | Collins | Feb. 20, 1940 |
| 2,487,618 | Twyman | Nov. 8, 1949 |
| 2,791,287 | Stolte | May 7, 1957 |
| 2,798,567 | Staude | July 9, 1957 |